(12) United States Patent
Williamson

(10) Patent No.: US 7,798,886 B1
(45) Date of Patent: Sep. 21, 2010

(54) REMOTE CONTROLLED UNMANNED VEHICLE AND COMBINATION COOLER

(76) Inventor: Tasia R. Williamson, 140 Elgar Pl., Apt. 21L, Bronx, NY (US) 10475

( * ) Notice: Subject to any disclaimer, the term of this patent is extended or adjusted under 35 U.S.C. 154(b) by 256 days.

(21) Appl. No.: 12/077,234

(22) Filed: Mar. 17, 2008

(51) Int. Cl.
A63H 30/04 (2006.01)
(52) U.S. Cl. .................. 446/456; 446/73; 446/465
(58) Field of Classification Search ............ 446/454, 446/456, 460, 465, 73, 93, 94, 95; 62/3.3, 62/3.6, 3.62; D7/81, 605, 606
See application file for complete search history.

(56) References Cited

U.S. PATENT DOCUMENTS

| | | | |
|---|---|---|---|
| 3,983,663 A * | 10/1976 | Edwards et al. ............. 446/465 |
| 4,817,191 A | 3/1989 | Adams |
| 4,932,677 A | 6/1990 | Shustack |
| D328,221 S | 7/1992 | Piccarillo |
| 5,407,218 A | 4/1995 | Jackson |
| 5,538,267 A | 7/1996 | Pasin et al. |
| 6,318,740 B1 | 11/2001 | Nappo |
| 6,474,097 B2 * | 11/2002 | Treppedi et al. ............ 62/457.7 |
| 6,502,656 B2 * | 1/2003 | Weiss et al. .................. 180/168 |
| D486,037 S * | 2/2004 | Corzo .......................... D7/606 |
| 6,857,930 B1 | 2/2005 | Lawley, Jr. |
| 6,973,799 B2 * | 12/2005 | Kuehl et al. .................... 62/244 |
| D516,869 S * | 3/2006 | Beal ............................. D7/605 |
| D582,217 S * | 12/2008 | Libby et al. .................. D7/606 |

* cited by examiner

Primary Examiner—Nini Legesse
(74) Attorney, Agent, or Firm—Richard L. Miller

(57) ABSTRACT

A remote controlled unmanned vehicle and combination cooler which comprises a miniature automobile-like shaped body. A first compartment is in a front portion of the body to carry various items therein not requiring refrigeration. A second compartment is in a rear portion of the body to carry various articles therein requiring refrigeration. A mechanism is for propelling the body over sand and irregular terrain. Another mechanism is for controlling the propelling mechanism by a person located externally away from the body.

11 Claims, 5 Drawing Sheets

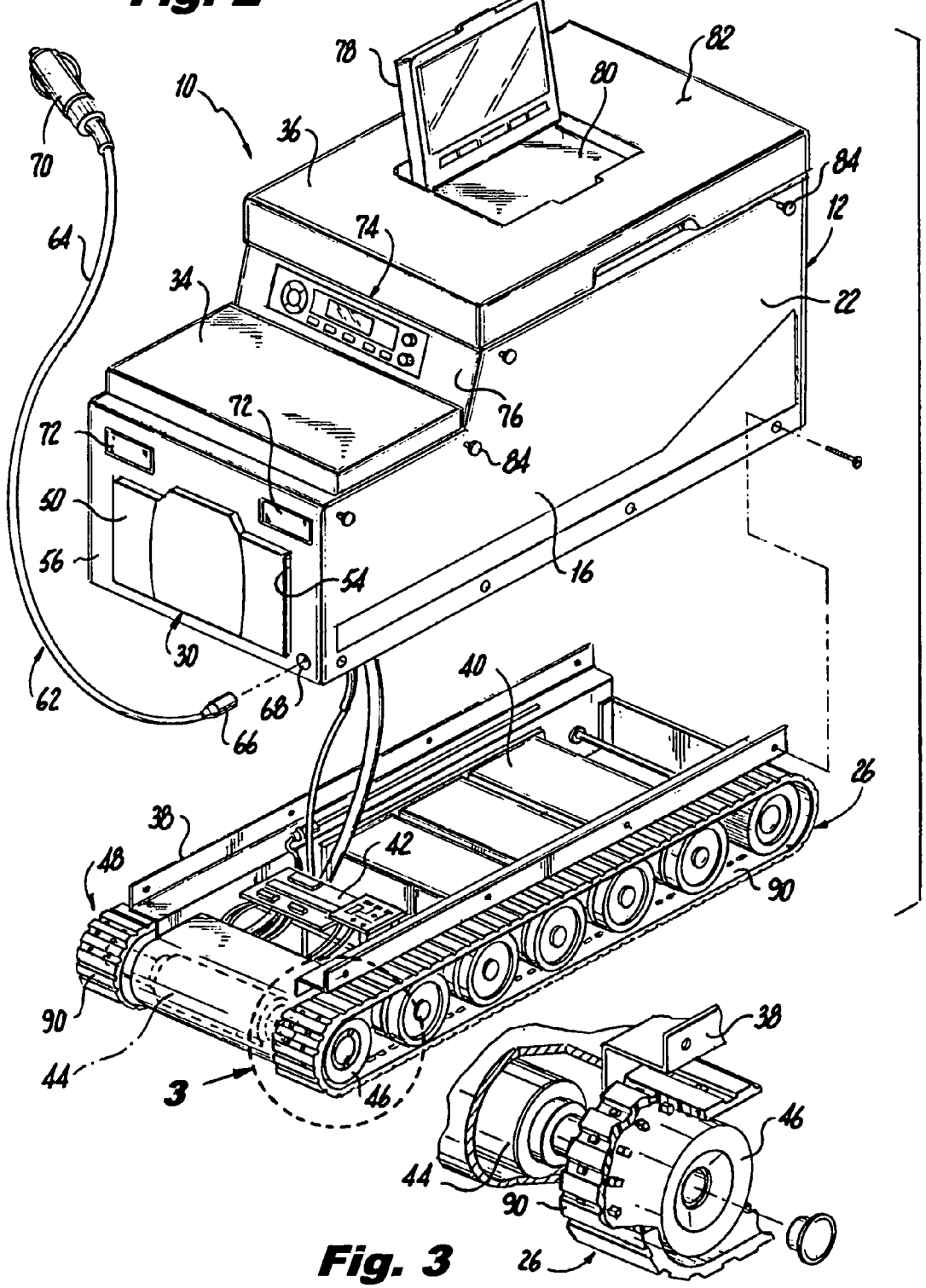

REMOTE CONTROLLED UNMANNED VEHICLE AND COMBINATION COOLER

BACKGROUND OF THE INVENTION

1. Field of the Invention

The present invention relates to a cooler, and more particularly, a remote controlled unmanned vehicle and combination cooler.

2. Description of the Prior Art

Numerous innovations for wheeled cooler devices have been provided in the prior art that will be described. Even though these innovations may be suitable for the specific individual purposes to which they address, however, they differ from the present invention.

A FIRST EXAMPLE, U.S. Pat. No. 4,817,191, Issued on Mar. 28, 1989, to Adams teaches an improved radio and cooler that incorporates a radio receiver unit into an indentation in the front wall of a four-walled, portable insulated cooler or ice chest. A separate rechargeable battery pack, connected by wires to the radio receiver unit, is integrated into the rear side of the lid of the cooler, on the opposite side of the cooler's center of gravity from the radio receiver unit, and thus acts as a counterbalance to the radio and improves the overall balance of the cooler. In addition, the radio's antenna is similarly positioned opposite the center of gravity from the radio receiver unit, on the upper rear side of the cooler lid, further enhancing the counterbalancing effect.

A SECOND EXAMPLE, U.S. Pat. No. 4,932,677, Issued on Jun. 12, 1990, to Shustack teaches a mobile cooler having a flexible tank track for moving the cooler over sand or irregular ground surfaces. The track members of the flexible tank track are normally made of rubber and are recessed into the outermost surfaces of the side walls of the insulated container to improve appearance of the cooler and to provide minimum obstruction to other articles when the cooler is stored in trunks or other compartments of automobiles. A retractable cord, attached to a spring loaded pulley recessed into the lower front wall of the cooler, facilitates towing of the cooler from place to place in a picnic area. A vertical leveling slot in each of the front axle supports keeps the track members in maximum contact with the surface of the ground during the towing process. Conventional pivotable handles attached to the front and back walls of the insulated container allow the cooler to be easily lifted or lowered in storing or retrieving the unit from storage.

A THIRD EXAMPLE, U.S. Pat. No. DES. 328,221, Issued on Jul. 28, 1992, to Piccarillo teaches an ornamental design for a wheeled cooler chest, as shown and described.

A FOURTH EXAMPLE, U.S. Pat. No. 5,407,218, Issued on Apr. 18, 1995, to Jackson teaches a wheeled cooler having an open top housing with a removable cover member forming a closed internal chamber for the storage of articles. At least two wheel members are rotatably secured to opposingly displaced sidewalls of the open top housing. The wheel members have a mechanism for removably capturing each of the wheel members individually within a respective transversely displaced sidewall. The wheel capturing mechanism includes a wheel base member which may be inserted in a tongue in groove connection to the sidewalls. In this manner there is provided a wheeled cooler which may easily have the wheel members removable from the housing or inserted within the housing for rotatable transport across a base surface.

A FIFTH EXAMPLE, U.S. Pat. No. 5,538,267, Issued on Jul. 23, 1996, to Pasin et al. teaches a convertible wagon which includes a handle that can be pivotally attached to a latch assembly on the front of the wagon body or can be snapped in an upright position into a locking assembly on the back wall of the wagon. The wagon can be pulled when the handle is attached to the latch assembly and can be pushed when the handle is snapped into the locking assembly. A removable panel separates passenger and storage compartments within the wagon body.

A SIXTH EXAMPLE, U.S. Pat. No. 6,318,740, Issued on Nov. 20, 2001, to Nappo teaches a toy wagon and cooler combination for carrying children passengers and storing items in a temperature moderated climate. The toy wagon and cooler combination includes a new toy wagon and cooler combination which includes a wagon body having a bottom wall, a front wall, a back wall, and a first side wall. A pulling means is used for pulling the wagon body. A plurality of wheels are each rotatably coupled to the bottom wall of the wagon body. A first cooler extends into a top edge of the front wall. The first cooler has a lid thereon. The lid is hingedly coupled to the top edge of the front wall. The lid is adapted to selectively open and close the first cooler.

A SEVENTH EXAMPLE, U.S. Pat. No. 6,857,930, Issued on Feb. 22, 2005, to Lawley, Jr. teaches a toy vehicle having a receiver, a drive motor, a steering motor, and a plurality of spring assemblies. The spring assemblies each have a spring, a solenoid, and a pin. The toy vehicle includes a rear cargo unit having a plurality of receptacles for housing the springs therein. A beverage can is stored on top of each spring, and when the solenoid is energized, the pin is released and the can is pushed upwardly into the air. The receiver is in communication with a remote transmitter, having directional controls for controlling the drive motor and the steering motor, and can release buttons. The remote transmitter signals the receiver for controlling the drive motor, the steering motor, and the spring assemblies.

It is apparent now that numerous innovations for wheeled cooler devices have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a remote controlled unmanned vehicle and combination cooler that avoids the disadvantages of the prior art.

ANOTHER OBJECT of the present invention is to provide a remote controlled unmanned vehicle and combination cooler that is simple and inexpensive to manufacture.

STILL ANOTHER OBJECT of the present invention is to provide a remote controlled unmanned vehicle and combination cooler that is simple to use.

BRIEFLY STATED, STILL YET ANOTHER OBJECT of the present invention is to provide a remote controlled unmanned vehicle and combination cooler which comprises a miniature automobile-like shaped body. A first compartment is in a front portion of the body to carry various items therein not requiring refrigeration. A second compartment is in a rear portion of the body to carry various articles therein requiring refrigeration. A mechanism is for propelling the body over sand and irregular terrain. Another mechanism is for controlling the propelling mechanism by a person located externally away from the body.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a diagrammatic exploded perspective view thereof;

FIG. 3 is an enlarged exploded diagrammatic perspective view with parts broken away of the area enclosed in the dotted circle indicated by arrow 3 in FIG. 2;

Figure 1:
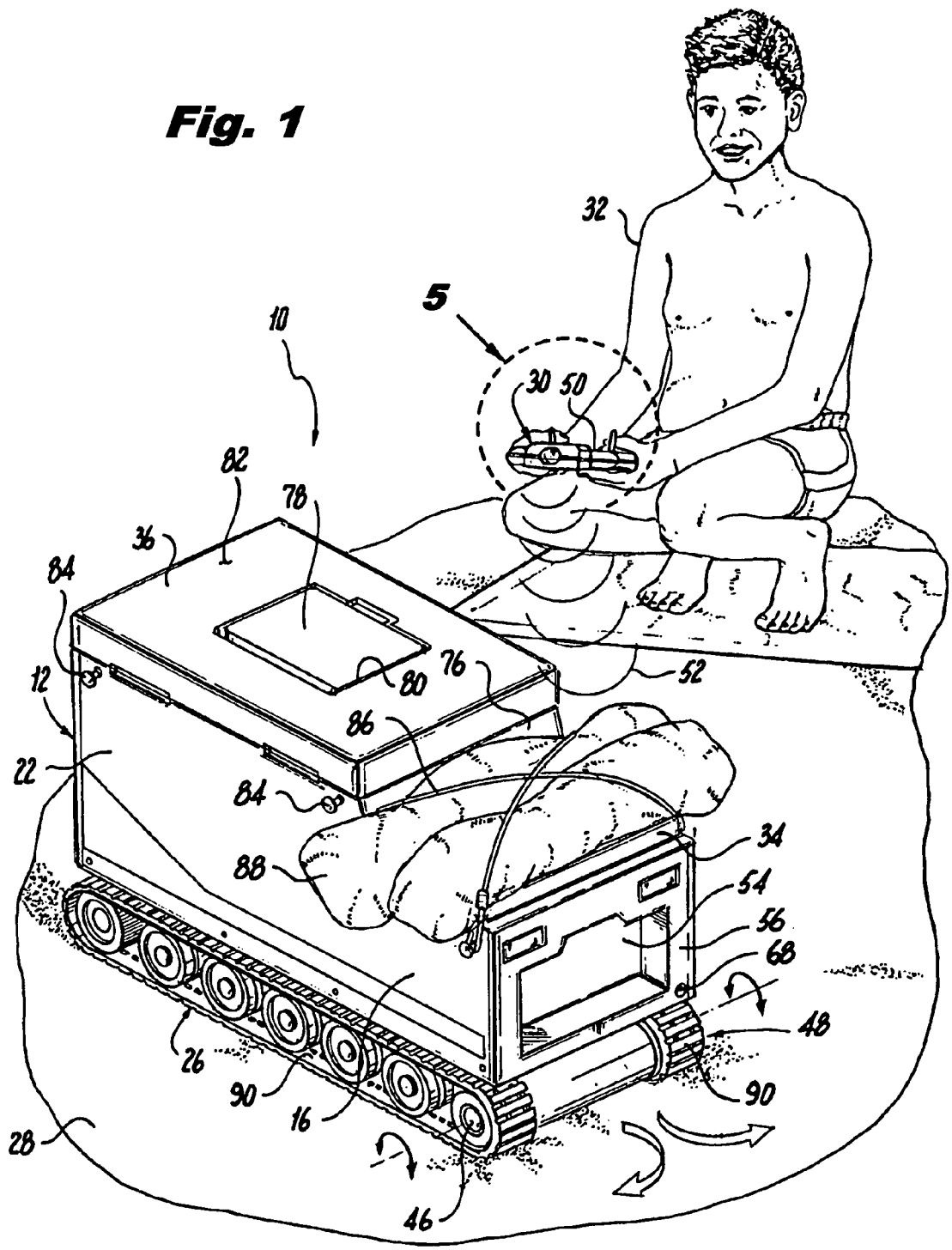
FIG. 1 is a diagrammatic perspective view showing, an embodiment of the present invention in use.

A MARSHALING OF REFERENCE NUMERALS UTILIZED IN THE DRAWING 10 remote controlled unmanned vehicle and combination cooler
12 miniature automobile-like shaped body of 10
14 first compartment in 16
16 front portion of 12
18 item in 14
20 second compartment in 22
22 rear portion of 12
24 article in 20
26 propelling mechanism of 10
28 sand
30 controlling mechanism of 10
32 person
34 cover of 14
36 lid of 20
38 tank-like chassis frame of 26
40 battery of 26
42 receiver and control system circuit of 26
44 motor of 26
46 drive wheel of 26
48 endless track of 26
50 remote control device of 30
52 command signal of 50
54 depression in 56
56 grill area of 16
58 insulated enclosure in 20
60 refrigeration circuit in 58
62 recharging component of 10
64 elongated wire of 62
66 jack on 64
68 socket in 56
70 plug on 64
72 headlight of 10
74 receiver of 10
76 windshield area of 12
78 television receiver of 10
80 recessed area in 82
82 top surface of 36
84 cleat on 12
86 bungee cord
88 beach blanket
90 long flexible track member of 48
92 triangular shaped separate flexible track member of 48

DETAILED DESCRIPTION OF THE PREFERRED EMBODIMENT

Figure 4:
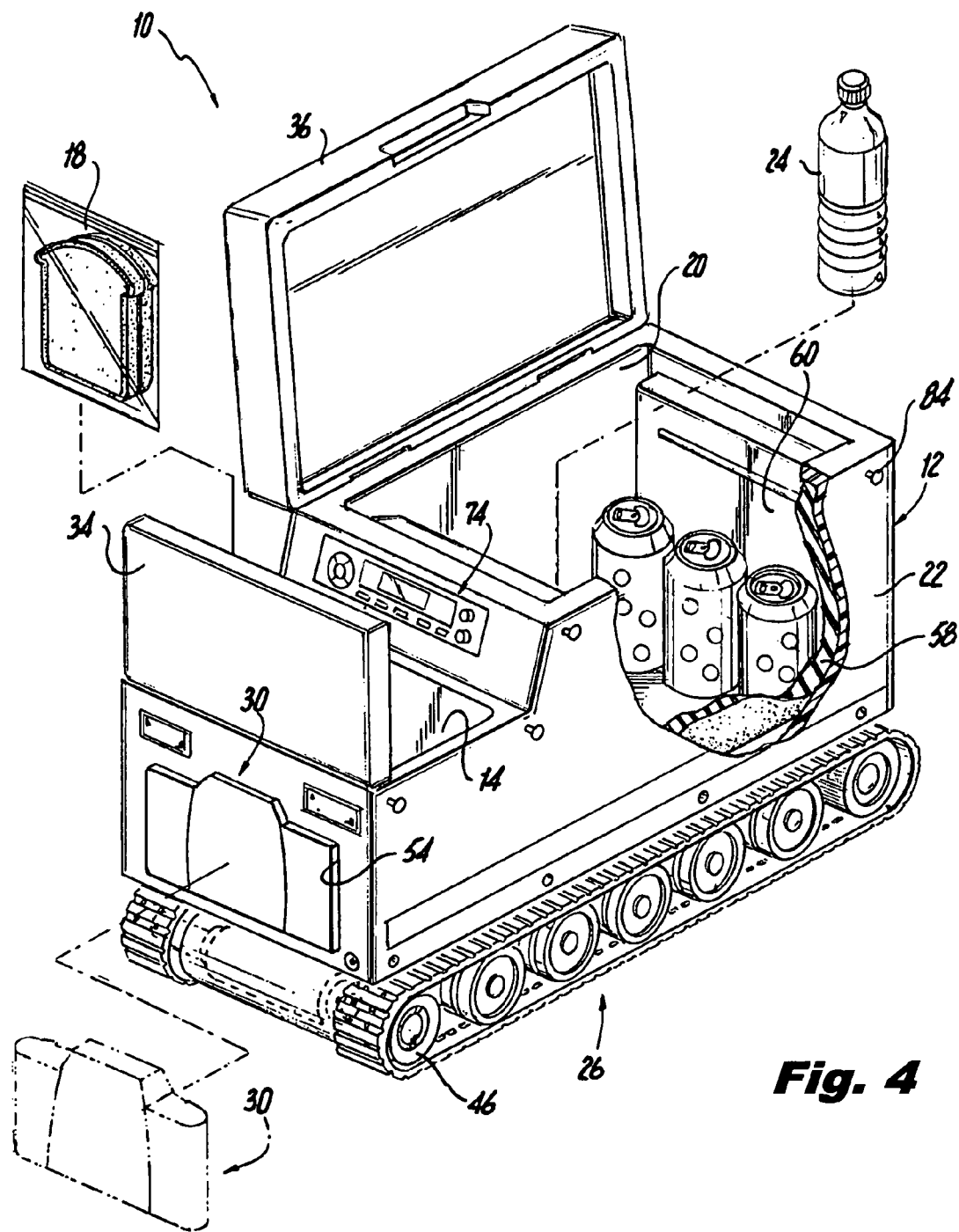
FIG. 4 is another diagrammatic perspective view with parts broken away and in section, showing various compartments of the invention open so that various appropriate items and articles may be stored therein.
Figure 5:
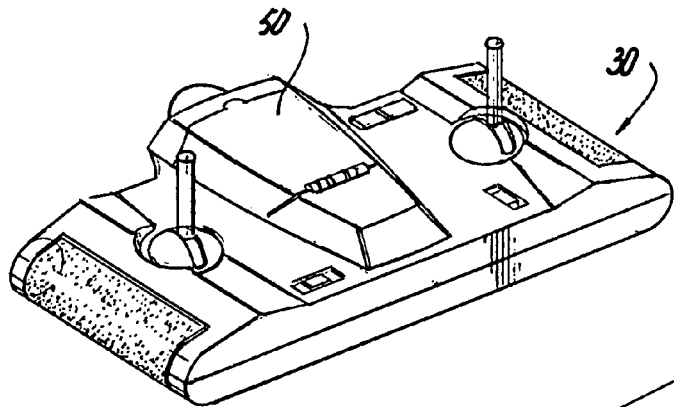
FIG. 5 is a diagrammatic perspective view, of the area enclosed in the dotted circle indicated by arrow 5 in FIG. 1, showing the remote control device in greater detail.

Referring now to the figures, in which like numerals indicate like parts, and particularly to FIGS. 1 through 7, which are a diagrammatic perspective view showing an embodiment of the present invention in use; a diagrammatic exploded perspective view thereof; an enlarged exploded diagrammatic perspective view with parts broken away of the area enclosed in the dotted circle indicated by arrow 3 in FIG. 2; another diagrammatic perspective view with parts broken away and in section, showing various compartments of the invention open so that various appropriate items and articles may be stored therein; a diagrammatic perspective view, of the area enclosed in the dotted circle indicated by arrow 5 in FIG. 1, showing the remote control device in greater detail; a diagrammatic perspective view similar to FIG. 4, having a different type of tractor system which will easily climb curbs in addition to being functional on the sand; and a block diagram of the electrical system of the present invention, and as such, will be discussed with reference thereto.

The present invention is a remote controlled unmanned vehicle and combination cooler 10 which comprises a miniature automobile-like shaped body 12. A first compartment 14 is in a front portion 16 of the body 12 to carry various items 18 therein not requiring refrigeration. A second compartment 20 is in a rear portion 22 of the body 12 to carry various articles 24 therein requiring refrigeration. A mechanism 26 is for propelling the body 12 over sand 28 and other irregular terrain. Another mechanism 30 is for controlling the propelling mechanism 26 by a person 32 located externally away from the body 12.

The first compartment 14 comprises a cover 34 hinged to top of the first compartment 14 to selectively open and close the first compartment 14. The second compartment 20 comprises a lid 36 hinged to top of the second compartment 20 to selectively open and close the second compartment 20.

The propelling mechanism 26 comprises a tank-like chassis frame 38 mounted to underside of the body 12. At least one battery 40 is carried in the tank-like chassis frame 38. A receiver and control system circuit 42 is carried in the tank-like chassis frame 38. A motor 44 is carried in the tank-like chassis frame 38 and is electrically connected to the at least one battery 40 and the receiver and control system circuit 42. The motor 44 will convert energy from the at least one battery 40 into mechanical motion. A plurality of drive wheels 46 are carried on the tank-like chassis frame 38 and coupled to the motor 44. A plurality of endless tracks 48 are driven by the drive wheels 46.

The controlling mechanism 30 comprises a remote control device 50 capable of transmitting command signals 52 to the receiver and control system circuit 42, so as to operate the motor 44 of the propelling mechanism 26. The front portion 16 of the body 12 comprises a depression 34 formed in a grill area 56 for storing the remote control device 50 when not in use.

The second compartment 20 comprises an insulated enclosure 58 to store the various articles 24 therein. A refrigeration circuit 60 is in the insulated enclosure 58 and is electrically connected to the at least one battery 40 and the control system circuit 42. The receiver and control system circuit 42 when activated by the remote control device 50, will cause the refrigeration circuit 60 to operate and keep the various articles 24 cold.

The remote controlled unmanned vehicle and combination cooler 10 further comprises a component 62 for recharging the at least one battery 40. (See FIG. 2.) The recharging component 62 comprises an elongated wire 64 that has a jack 66 on a first end to engage with a socket 68 in the grill area 56 of the front portion 16 of the body 12, wherein the socket 68 is electrically connected to the at least one battery 40. The elongated wire 64 has a plug 70 on a second end to engage with a power source typically a cigarette lighter receptacle in a motor vehicle (not shown) or a conventional house wall plug.

A pair of headlights 72 are on the grill area 56 of the front portion 16 of the body 12. A receiver 74 is in a windshield area 76 between the front portion 16 and the rear portion 22 of the body 12. A television receiver 78 is hinged within a recessed area 80 in a top surface 82 of the lid 36 on the rear portion 22 of the body 12. The headlights 72, the receiver 74 and the television receiver 78 are each electrically connected to the at least one battery 40 and the receiver and control system circuit 42. A plurality of cleats 84 are mounted on opposite sides of the body 12, so that bungee cords 86 can engage with the cleats to hold a beach blanket 88 and other garments to the body 12.

Figure 6:
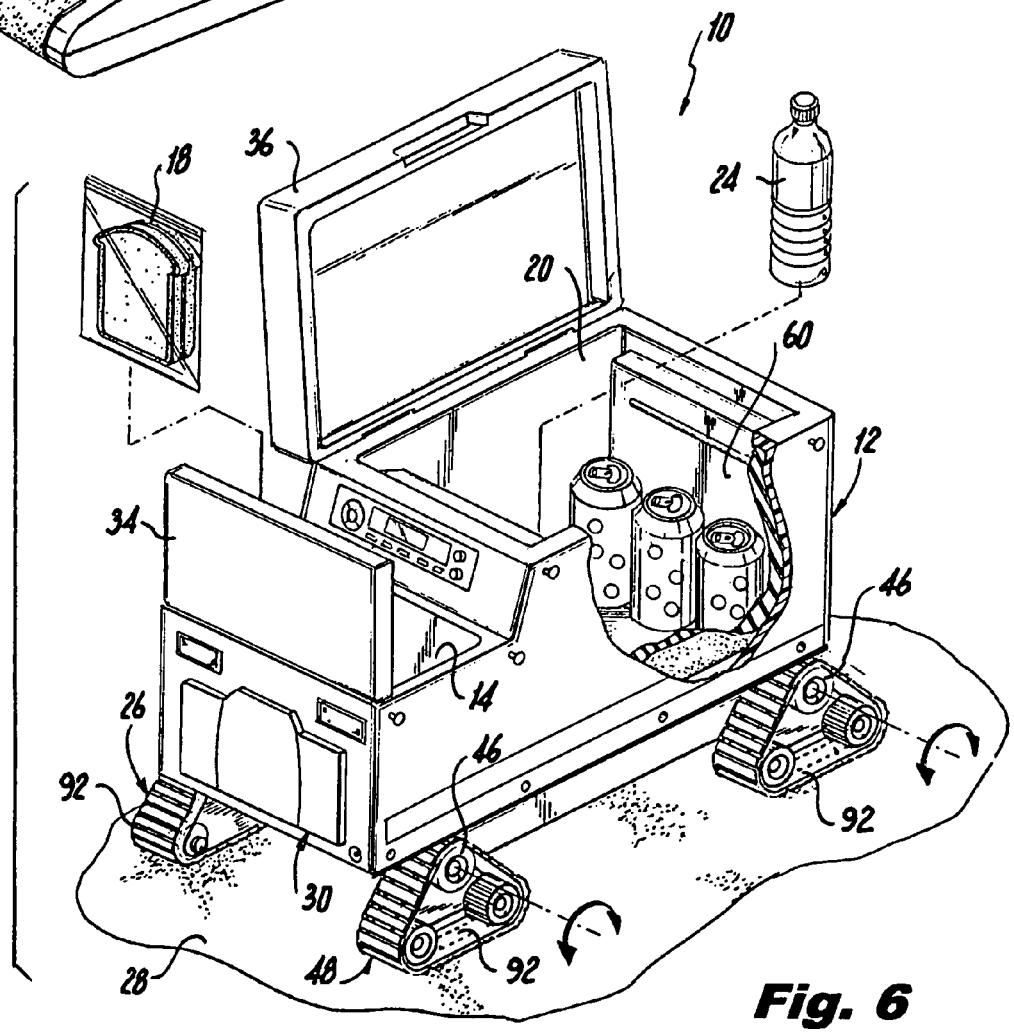
FIG. 6 is a diagrammatic perspective view similar to FIG. 4, having a different type of tractor system which will easily climb curbs in addition to being functional on the sand.
Figure 7:
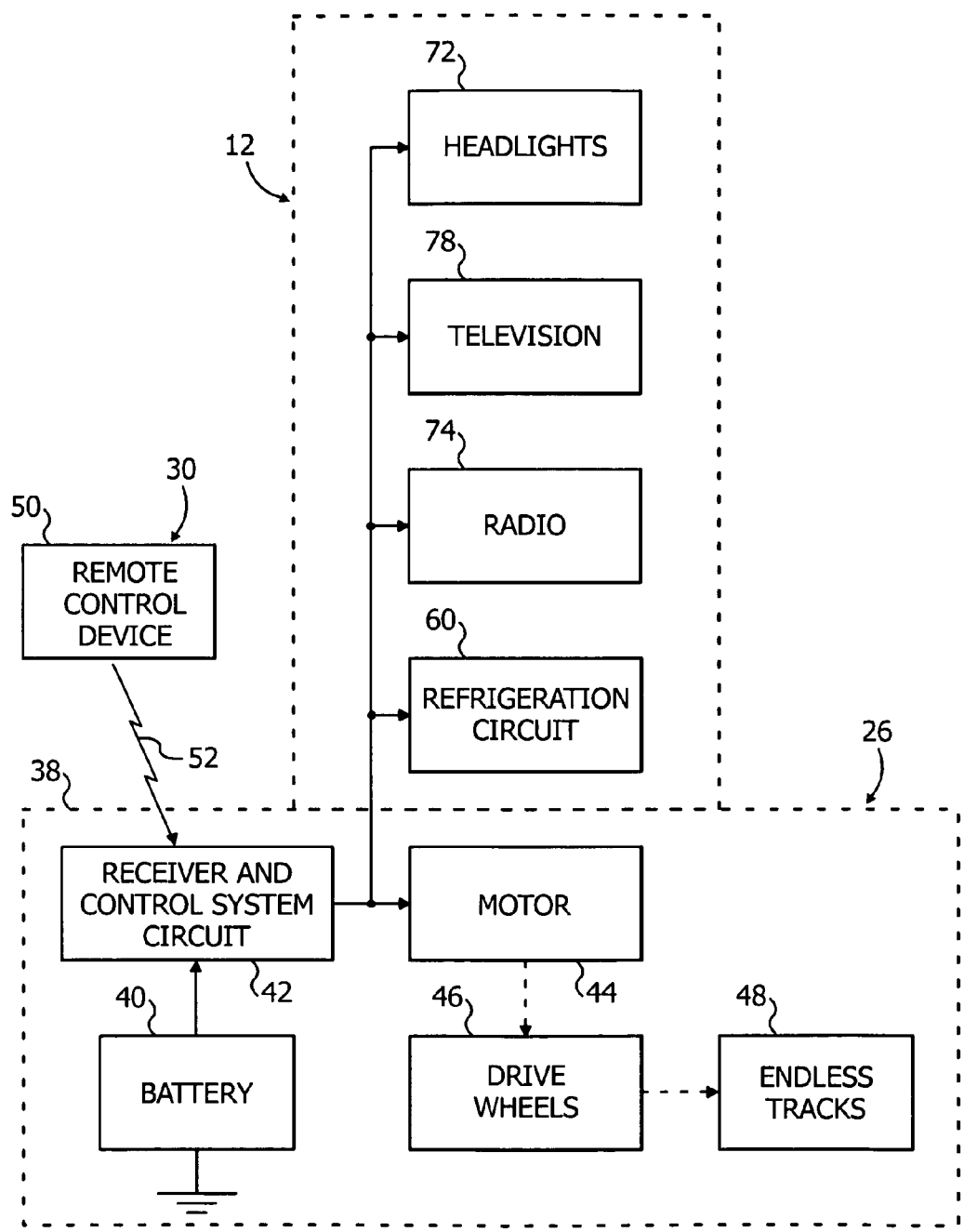
FIG. 7 is a block diagram of the electrical system of the present invention.

The endless tracks 48, as shown in FIGS. 1 through 4, are comprised of a pair of long flexible track members 90. Each of the long flexible track members 90 are located on one side of the tank-like chassis frame 38. The endless tracks 48, as shown in FIG. 6, is comprised of four triangular shaped separate flexible track members 92. Two of the flexible track members 92 are each located on one side of the tank-like chassis frame 38, to easily climb curbs in addition to being functional on the sand 28.

It will be understood that each of the elements described above, or two or more together, may also find a useful application in other types of constructions differing from the types described above.

While the invention has been illustrated and described as embodiments of a remote controlled unmanned vehicle and combination cooler, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A remote controlled unmanned vehicle and combination cooler which comprises:
    a) a miniature automobile-like shaped body;
    b) a first compartment in a front portion of said body to carry various items therein not requiring refrigeration;
    c) a second compartment in a rear portion of said body to carry various articles therein requiring refrigeration;
    d) means for propelling said body over sand and other irregular terrain; and
    e) means for controlling said propelling means by a person located externally away from said body;
    wherein said propelling means comprises:
       i) a tank-like chassis frame mounted to underside of said body;
       ii) at least one battery carried in said tank-like chassis frame;
       iii) a control system circuit carried in said tank-like chassis frame;
       iv) a motor carried in said tank-like chassis frame and electrically connected to said at least one battery and said control system circuit, wherein said motor will convert energy from said at least one battery into mechanical motion;
       v) a plurality of drive wheels carried on said tank-like chassis frame and coupled to said motor; and
       vi) a plurality of endless tracks driven by said drive wheels;
    wherein said endless tracks comprise four triangular shaped separate flexible track members, in which two of said flexible track members are each located on one side of said tank-like chassis frame, to easily climb curbs in addition to being functional on the sand.

2. The remote controlled unmanned vehicle and combination cooler as recited in claim 1, wherein said first compartment comprises a cover hinged to top of said first compartment to selectively open and close said first compartment.

3. The remote controlled unmanned vehicle and combination cooler as recited in claim 1, wherein said second compartment comprises a lid hinged to top of said second compartment to selectively open and close said second compartment.

4. The remote controlled unmanned vehicle and combination cooler as recited in claim 1, wherein said controlling means comprises a remote control device capable of transmitting command signals to said control system circuit, so as to operate said motor of said propelling means.

5. The remote controlled unmanned vehicle and combination cooler as recited in claim 4, wherein said front portion of said body comprises a depression formed in a grill area for storing said remote control device when not in use.

6. The remote controlled unmanned vehicle and combination cooler as recited in claim 5, further comprises means for recharging said at least one battery.

7. The remote controlled unmanned vehicle and combination cooler as recited in claim 6, wherein said recharging means comprises an elongated wire having a jack on a first end to engage with a socket in the grill area of said front portion of said body, wherein the socket is electrically connected to said at least one battery and said elongated wire having a plug on a second end to engage with a cigarette lighter receptacle in a motor vehicle.

8. The remote controlled unmanned vehicle and combination cooler as recited in claim 4, wherein said second compartment comprises:
    a) an insulated enclosure to store the various articles therein; and
    b) a refrigeration circuit in said insulated enclosure and electrically connected to said at least one battery and said control system circuit, wherein said control system circuit when activated by said remote control device will cause said refrigeration circuit to operate and keep the various articles cold.

9. The remote controlled unmanned vehicle and combination cooler as recited in claim 1, further comprising:
    a) a pair of headlights on the grill area of said front portion of said body;
    b) a receiver in a windshield area between said front portion and said rear portion of said body; and c) a television receiver hinged within a recessed area in a top surface of said lid on said rear portion of said body, wherein said headlights, said receiver and said television receiver are each electrically connected to said at least one battery and said control system circuit.

10. The remote controlled unmanned vehicle and combination cooler as recited in claim 1, further comprising a plurality of cleats mounted on opposite sides of said body, wherein a bungee cords can engage with said cleats to hold a beach blanket and other garments to said body.

11. A remote controlled unmanned vehicle and combination cooler which comprises:
   a) a miniature automobile-like shaped body;
   b) a first compartment in a front portion of said body to carry various items therein not requiring refrigeration;
   c) a second compartment in a rear portion of said body to carry various articles therein requiring refrigeration;
   d) means for propelling said body over sand and other irregular terrain; and
   e) means for controlling said propelling means by a person located externally away from said body;
      wherein said propelling means comprises:
         i) a tank-like chassis frame mounted to underside of said body;
         ii) at least one battery carried in said tank-like chassis frame;
         iii) a control system circuit carried in said tank-like chassis frame;
         iv) a motor carried in said tank-like chassis frame and electrically connected to said at least one battery and said control system circuit, wherein said motor will convert energy from said at least one battery into mechanical motion;
         v) a plurality of drive wheels carried on said tank-like chassis frame and coupled to said motor; and
         vi) a plurality of endless tracks driven by said drive wheels;
      wherein said second compartment comprises a lid hinged to top of said second compartment to selectively open and close said second compartment;
   wherein said controlling means comprises a remote control device capable of transmitting command signals to said control system circuit, so as to operate said motor of said propelling means;
   wherein said front portion of said body comprises a depression formed in a grill area for storing said remote control device when not in use;
   wherein said second compartment comprises:
      f) an insulated enclosure to store the various articles therein; and
      g) a refrigeration circuit in said insulated enclosure and electrically connected to said at least one battery and said control system circuit, wherein said control system circuit when activated by said remote control device will cause said refrigeration circuit to operate and keep the various articles cold, further comprises means for recharging said at least one battery;
   wherein said recharging means comprises an elongated wire having a jack on a first end to engage with a socket in the grill area of said front portion of said body, wherein the socket is electrically connected to said at least one battery and said elongated wire having a plug on a second end to engage with a cigarette lighter receptacle in a motor vehicle, further comprising:
      A) a pair of headlights on the grill area of said front portion of said body;
      B) a receiver in a windshield area between said front portion and said rear portion of said body; and
      C) a television receiver hinged within a recessed area in a top surface of said lid on said rear portion of said body, wherein said headlights, said receiver and said television receiver are each electrically connected to said at least one battery and said control system circuit, further comprising a plurality of cleats mounted on opposite sides of said body, wherein a bungee cords can engage with said cleats to hold a beach blanket and other garments to said body;
   wherein said endless tracks comprise a pair of long flexible track members, in which each said long flexible track member is located on one side of said tank-like chassis frame.

* * * * *